(12) United States Patent
Hio et al.

(10) Patent No.: US 8,345,164 B2
(45) Date of Patent: Jan. 1, 2013

(54) VIDEO SWITCHING APPARATUS AND VIDEO INPUT SETTING METHOD

(75) Inventors: Akimitsu Hio, Tokyo (JP); Yuuichi Hayatsu, Tokyo (JP); Norimasa Ozaki, Kanagawa (JP); Naomi Itoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 1265 days.

(21) Appl. No.: 11/900,220

(22) Filed: Sep. 11, 2007

(65) Prior Publication Data

US 2008/0062329 A1 Mar. 13, 2008

(30) Foreign Application Priority Data

Sep. 12, 2006 (JP) ................................ P2006-247178

(51) Int. Cl.
*H04N 5/268* (2006.01)
*H04N 9/12* (2006.01)
*H04N 7/035* (2006.01)
*H04N 5/46* (2006.01)

(52) U.S. Cl. ........ 348/705; 348/383; 348/465; 348/558; 348/706

(58) Field of Classification Search ........................ None
See application file for complete search history.

(56) References Cited

U.S. PATENT DOCUMENTS

| 6,201,580 B1 * | 3/2001 | Voltz et al. | 348/584 |
| 7,859,601 B2 * | 12/2010 | Kondo | 348/789 |
| 7,880,816 B2 * | 2/2011 | Kinoshita et al. | 348/705 |

FOREIGN PATENT DOCUMENTS

| JP | 2000 295525 | 10/2000 |
| JP | 2004 186899 | 7/2004 |
| JP | 2007 135079 | 5/2007 |

* cited by examiner

*Primary Examiner* — Kristine Kincaid
*Assistant Examiner* — Oschta Montoya
(74) *Attorney, Agent, or Firm* — Frommer Lawrence & Haug LLP; William S. Frommer; Thomas F. Presson

(57) ABSTRACT

A video switching apparatus has a plurality of slots each for mounting any of a first input module capable of inputting any one of a plurality of predetermined types of video signals and performing processing, content of which varies depending on the type of input video signal and a second input module capable of inputting only predetermined one type of video signal. The video switching apparatus switches and outputs video signals of a plurality of channels input to the input modules mounted to the plurality of slots. The video switching apparatus includes an input setup data memory processor, a detector, and an input setup changer.

20 Claims, 11 Drawing Sheets

*FIG. 1*

| Readout Input Setup / Present Input Module | RGB | Composite | S-Video | DV | SDI |
|---|---|---|---|---|---|
| PC Module | No Change | RGB | RGB | RGB | RGB |
| SD Module | Composite | No Change | No Change | No Change | Composite |
| SDI Module | SDI | SDI | SDI | SDI | No Change |

SDI Module
Slot A

PC Module
Slot B

SD Module
(Composite)
Slot A

SD Module
(S-Video)
Slot B

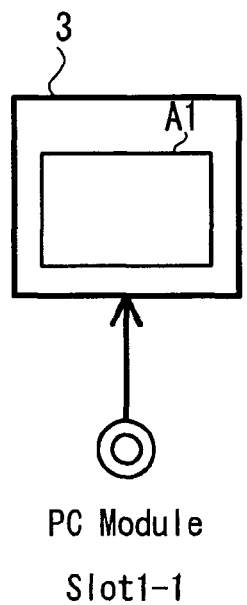 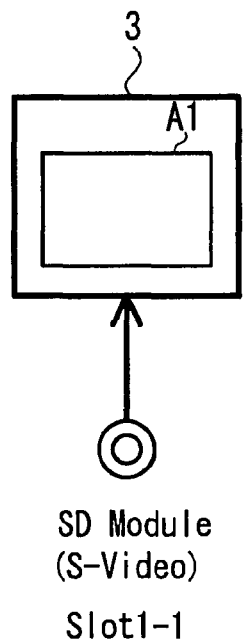 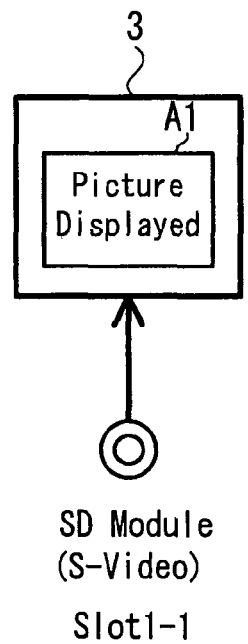

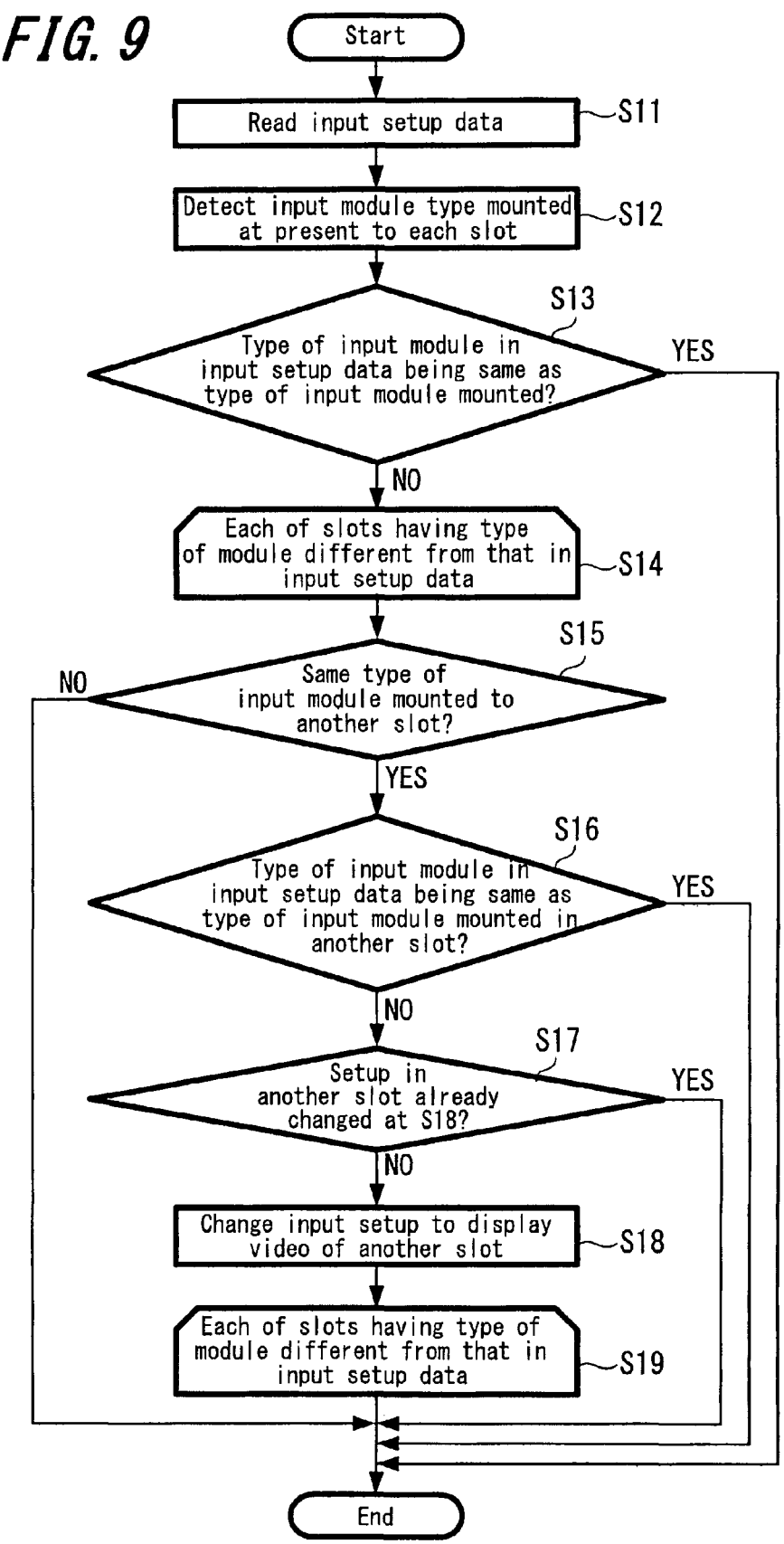

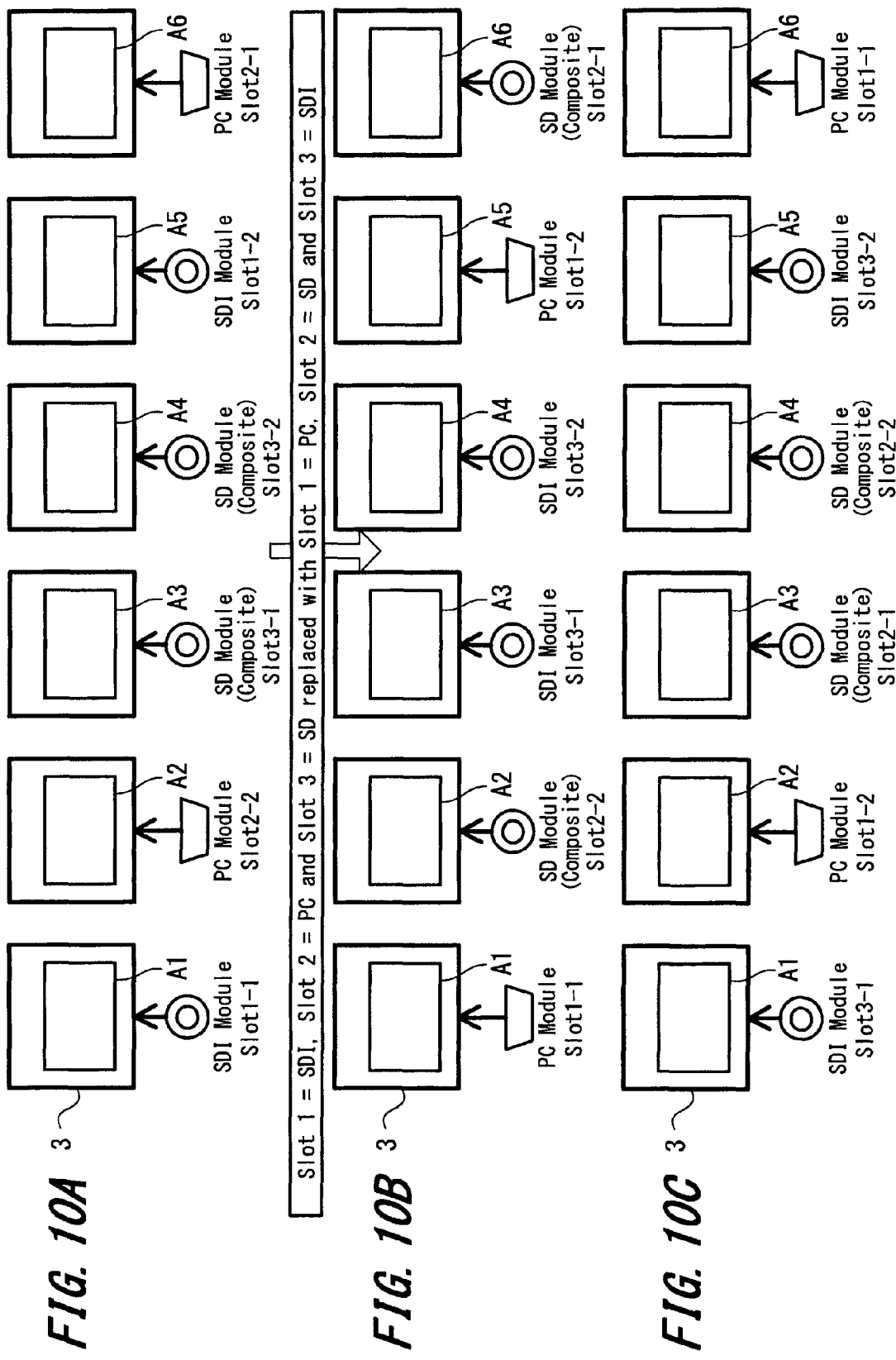

VIDEO SWITCHING APPARATUS AND VIDEO INPUT SETTING METHOD

CROSS REFERENCES TO RELATED APPLICATIONS

The present invention contains subject matter related to Japanese Patent Application JP 2006-247178 filed in the Japanese Patent Office on Sep. 12, 2006, the entire contents of which being incorporated herein by reference.

BACKGROUND OF THE INVENTION

1. Field of the Invention

The present invention relates to an apparatus that switches and outputs input video signals on a plurality of channels. Particularly, the present invention relates to the apparatus to which various types of video signals are input.

2. Description of the Related Art

Video switchers (video switching apparatuses) are used for producing video contents. Video signals on a plurality of channels are input to a video switcher that switches and outputs those video signals and performs processing (e.g., effects such as wiping, and keying) on video at switching.

Although a video switcher is installed and used in a television broadcasting station, there is also a portable video switcher (for example, refer to Sony Corporation "Live Content Producer AWS-G500" issued in November 2005). A portable video switcher includes a processing unit configured to perform switching and processing on video content, an operation unit configured to perform various operations, and a display unit configured to display input video or the like, which are integrally formed. Such portable video switcher can be carried to, for example, a place where an event or the like is held and the carried portable video switcher is used to produce such video contents as introducing an activity of the event or the like.

Typically, video cameras of different models and a personal computer may be used to output video signals in respective places. Accordingly, a portable video switcher may need to have a configuration for composite, S-Video, DV (Digital Video), RGB and other video signals input to respective video cameras and personal computers that are used in such places.

For example, the video switcher described in the above Non-patent Reference (hereinafter, referred to as "related-art video switcher") includes a plurality of slots for mounting video signal input modules in order to satisfy such requirement. Three kinds of modules (a) through (C) are prepared as the input modules capable of being mounted to those slots.

(a) SD module for any one of composite signal, S-Video signal and DV signal inputs;
(b) PC module for RGB signal input; and
(c) SDI module for SDI signal (serial/digital video signal based on SMPTE259M standard) input Further, the related-art video switcher includes a function of collectively storing data indicating setup content carried out by a user so that later the stored data can be read and used (moreover, such data is stored on a compact memory card so that the data can also be used by another video switcher). The setup content data stored by such function includes settings for the type of input module mounted to each slot and the type of video signal input thereto.

However, the type of video signal input to the video switcher depends on a video camera and personal computer used as described above. Accordingly, if the past input setup with the function is used, there may be a number of cases in which another type of input module is mounted at present to the slot. Further, in the case where another video switcher uses the input setup, there may be a number of cases in which a different type of input module from the present input setup is mounted from the beginning.

In a video switcher of related art, in the case where an input module of a type different from the past input setup is mounted at present, processing of changing the input setup is manually performed.

FIG. 1 is a table showing the content of input setup change processing. Each cell of the uppermost row shows a type of input signal in the past input setup data, which has been read. Each cell of the left end column shows a type of input module mounted at present. Other cells show the content of input setup to be changed.

As shown in FIG. 1, cells highlighted with thick lines indicate that RGB and SDI signals (i.e., video signals to be input to the other modules than the SD module) are used in the past input setup, which are changed into input setup for the composite signal if the input module mounted at present is the SD module. Processing performed in the SD module is different depending on the type of input video signals. Composite signal and S-Video signal are converted into a digital component signal through luminance/color-difference separation processing and analogue/digital conversion processing. On the other hand, DV signal is converted into a digital component signal using a DV codec, and in addition, the luminance/color-difference separation processing also differs between the composite signal and S-Video signal. Accordingly, processing on the composite signal is performed in the SD module as a default (initial setting).

SUMMARY OF THE INVENTION

However, after the input setup is changed to that for the composite signal as shown with the thick lines in FIG. 1, S-Video signal and DV signal are still input to the SD module depending on the model of the video camera used at present. In such case, S-Video signal and DV signal may not be processed in the SD module since the input setup is composite signal. As a result, pictures of the S-Video signal and DV signal may not be displayed on a display unit. Further, S-Video signal and DV signal may not be switched and output from the video switcher.

FIGS. 2A and 2B are diagrams showing an example of the above-described state. As shown in FIG. 2A, an SDI module and a PC module are mounted to Slots A, B, respectively. Input setup data is stored while pictures of video signals output from the Slots A, B are displayed in respective areas 52, 53 in part of a screen of a display unit 51. As shown in FIG. 2B, the input setup data is read after the input modules mounted to the slots A, B are changed to SD modules respectively. Alternatively, another video switcher having SD modules respectively mounted to Slots A, B reads the input setup. In such a case, composite signal and S-Video signal are here input to the respective SD modules mounted to the slots A, B.

Since the type of input video signal corresponds to composite signal after the input setup change processing shown in FIG. 1, the input composite signal can be processed in the SD module mounted to Slot A. On the other hand, the input S-Video signal may not be processed in the SD module mounted to Slot B since the type of the input video signal does not correspond to the composite signal after the input setup change processing shown in FIG. 1. As a result, a picture of a video signal output from Slot A is displayed in the area 52 of the display unit 51 but a picture of a video signal output from Slot B is not displayed in the area 53 of the display unit 51 as shown in FIG. 2B.

In order to display the picture of the video signal output from Slot B and to switch and output the video signal from Slot B under such state, it may have been necessary in the past to change the input setup of Slot B to the setup of S-Video signal by manually operating the operation unit. In such case, a user first checks that S-Video signal is input to the SD module mounted to Slot B based on a connection state of the SD module and video camera, or the like, and manually operates the operation unit. Therefore, such confirmation work or the like may be cumbersome for the user.

It is desirable to reduce cumbersome work when changing an input setup in response to a video signal input at present into a video switching apparatus including an input module such as an SD module in the above-described video switcher of related art in which content of processing varies depending on the type of the input video signal.

A video switching apparatus according to an embodiment of the present invention has a plurality of slots for mounting an input module for video signal input. One of a first input module and a second input module can be mounted to the slots. The first input module is capable of inputting any one of a plurality of predetermined types of video signals and performs processing, content of which varies depending on the type of input video signal. The second input module is capable of inputting only predetermined one type of video signal. The video switching apparatus switches and outputs video signals of a plurality of channels input to the input modules mounted to the plurality of slots. The video switching apparatus includes an input setup data memory processor, a detector and an input setup changer. The input setup data memory processor stores input setup data indicating a type of input module mounted to each of the slots and a type of video signal input thereto in a memory unit. The detector reads the input setup data from the memory unit and detects a slot having an input module mounted at present the type of which is not matched with the type of module indicated in the read input setup data. The input setup changer determines the type of video signal input to the first input module and causes the first input module to execute processing corresponding to the determined type of video signal upon detecting that the input module mounted at present to the slot is the first input module by the detector.

A video input setting method according to an embodiment of the present invention is a video signal input setting method for a video switching apparatus which has a plurality of slots for mounting an input module for video signal input. One of a first input module and a second input module can be mounted to the slots. The first input module is capable of inputting any one of a plurality of predetermined types of video signals and performs processing, content of which varies depending on the type of input video signal. The second input module is capable of inputting only predetermined one type of video signal. The video switching apparatus switches and outputs video signals of a plurality of channels input to the input modules mounted to the plurality of slots. The video signal input setting method includes the steps of:

storing input setup data indicating a type of input module mounted to each of the slots and a type of video signal input thereto by a controller provided in the video switching apparatus in a memory unit;

reading by the controller the input setup data from the memory unit and detecting a slot having an input module mounted at present the type of which is not matched with the type of module indicated by the read input setup data; and determining by the controller the type of video signal input to the first input module and causing the first input module to execute processing corresponding to the determined type of video signal upon detecting that the input module mounted at present to the slot is the first input module by the detector.

According to the above-described embodiments of the present invention, it is possible to store the past input setup data and later use the stored data, similarly to the video switcher of related art which is described above. Further, in the case where an input module different from the input module indicated in the past input setup data is mounted at present and the mounted input module is the input module, processing of which varies depending on the type of input video signal, the type of video signal input to the input module is automatically determined so that the processing corresponding to the determined type is automatically performed. Therefore, the input setup is automatically changed corresponding to the type of input video signal at present without checking the type thereof and without manually executing a change operation.

A video switching apparatus according to another embodiment of the present invention has a plurality of slots for mounting an input module for video signal input. One of a first input module and a second input module can be mounted to the slots. The first input module is capable of inputting any one of a plurality of predetermined types of video signals and performs processing, content of which varies depending on the type of input video signal. The second input module is capable of inputting only predetermined one type of video signal. The video switching apparatus switches and outputs video signals of a plurality of channels input to the input modules mounted to the plurality of slots. The video switching apparatus includes an input setup data memory processor, a detector and an information display processor. The input setup data memory processor stores input setup data indicating a type of input module mounted to each of the slots and a type of video signal input thereto in a memory unit. The detector reads the input setup data from the memory unit and detects a slot having an input module mounted at present the type of which is not matched with the type of the module indicated in the read input setup data. The information display processor determines the type of video signal input to the first input module and causes information indicating the determined type of video signal to be displayed on a screen of a display unit upon detecting that the input module mounted at present to the slot is the first input module by the detector.

A video input setting method according to another embodiment of the present invention is a video signal input setting method for a video switching apparatus which has a plurality of slots for mounting an input module for video signal input. One of a first input module and a second input module can be mounted to the slots. The first input module is capable of inputting any one of a plurality of predetermined types of video signals and performs processing, content of which varies depending on the type of input video signal. The second input module is capable of inputting only predetermined one type of video signal. The video switching apparatus switches and outputs video signals of a plurality of channels input to the input modules mounted to the plurality of slots. The video signal input setting method includes the steps of:

storing input setup data indicating a type of input module mounted to each of the slots and a type of video signal input thereto in a memory unit by a controller provided in the video switching apparatus;

reading by the controller the input setup data from the memory unit and detecting a slot having an input module mounted at present the type of which is not matched with the type of the module indicated in the read input setup data; and determining by the controller the type of video signal input to the first input module and causing information indicating the determined type of video signal to be displayed on a screen of a display unit upon detecting that the input module mounted at present in the slot is the first input module by the detector.

According to the above-described embodiments of the present invention, it is possible to store the past input setup data and later use the stored data, similarly to the video switcher of related art which is described above. Further, in the case where an input module different from the input module indicated in the past input setup data is mounted at present and the mounted input module is the input module, processing of which varies depending on the type of input video signal, the type of video signal input to the input module is automatically determined so that the information indicating the determined type is displayed. As a result, the user can confirm readily and instantaneously the type of the present input video signal by viewing the display and perform the operation of changing the input setup.

According to the video switching apparatus and the input setting of the embodiments, it is possible to use past input setup data when mounting the input module, processing of which varies depending on the type of input video signal. Further, the input setup is automatically changed corresponding to the type of the present input video signal without checking the type of input video signal at present and without manually executing a change operation.

According to the video switching apparatus and the input setting method of the other embodiments, it is possible to use past input setup data when monitoring the input module, processing of which varies depending on the type of input video signal. Further, the user can confirm readily and instantaneously the type of input video signal at present and perform the operation of changing the input setup.

BRIEF DESCRIPTION OF THE DRAWINGS

FIG. 1 is a table showing content of input setup change processing in a video switcher according to related art.

FIGS. 8A to 8C are diagrams showing an example in which an input setup is changed by the processing indicated in FIG. 7.

FIG. 9 is a flow chart illustrating the input setup change processing performed by the main CPU shown in FIG. 6.

FIGS. 10A to 10C are diagrams showing examples in which an input setup is changed by the processing indicated in FIG. 9.

DESCRIPTION OF THE PREFERRED EMBODIMENTS

Figure 3:
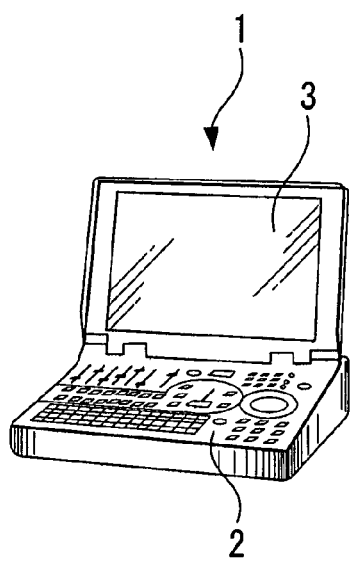
FIG. 3 is a diagram showing the whole appearance of a video switcher to which an embodiment of the present invention is applied.

Hereinafter, embodiments of the present invention are specifically explained referring to the accompanied drawings. Those embodiments are applied to a portable video switcher. FIG. 3 is a perspective view of the whole appearance of a portable video switcher to which an embodiment of the present invention is applied. A video switcher 1 according to the embodiment has a shape somewhat larger than a notebook type personal computer. The video switcher 1 is brought to a place where an event or the like is held, for example, and is used to produce video content introducing such event by inputting video signals from a video camera and a personal computer.

The video switcher 1 includes an operation unit 2 configured to perform various operations such as setup, storage and retrieval of setup content, change of setup, selection of input video, switching of video, selection of effects, selection of an output mode of video and the like at a position where a keyboard is provided in a notebook type personal computer. Further, the video switcher 1 includes a liquid crystal display 3 similarly to a notebook type personal computer.

Figure 4:
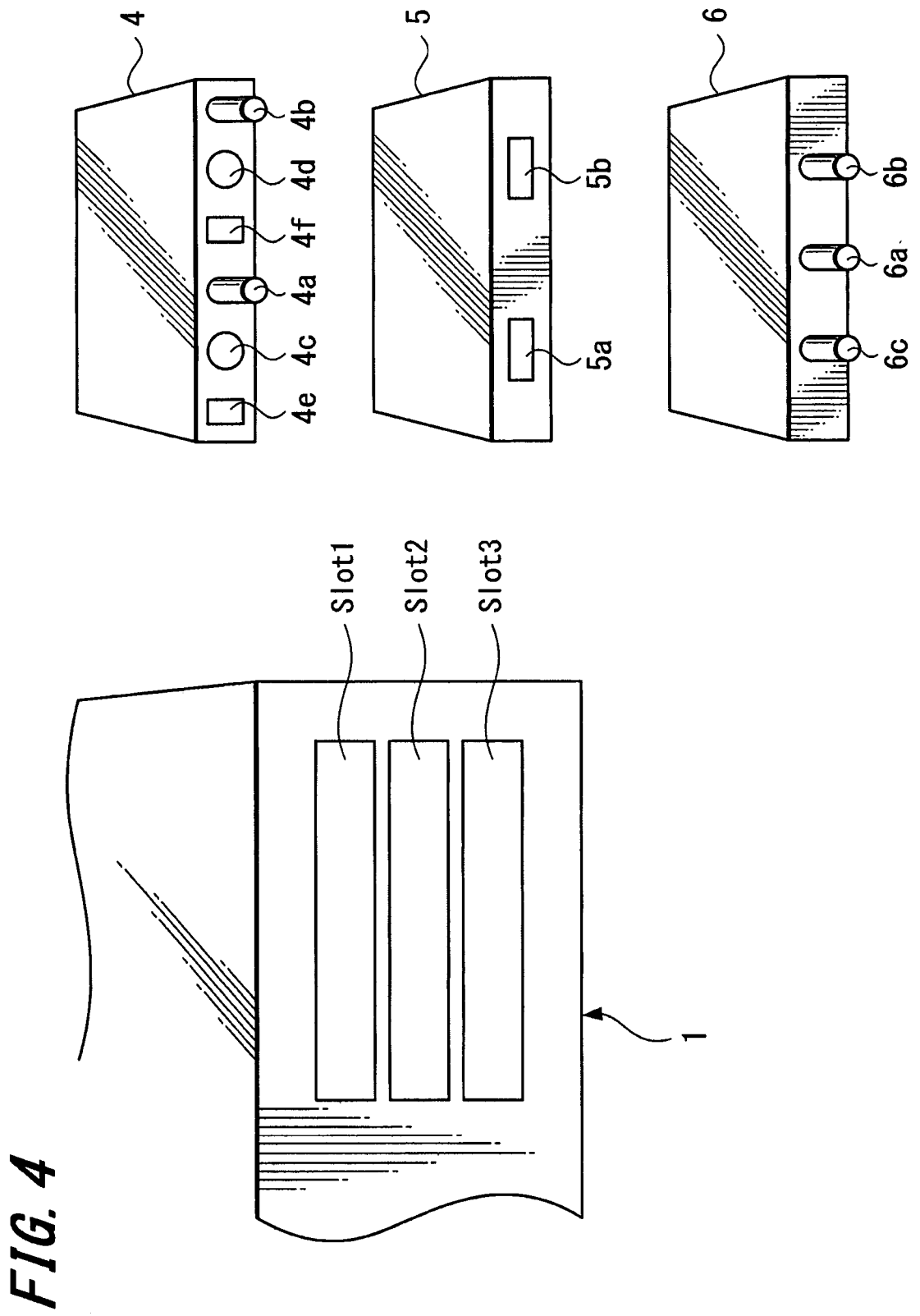
FIG. 4 is a diagram showing slots at the rear of the video switcher shown in FIG. 3 and appearances of input modules mounted to those slots.

Three slots for mounting an input module for video signal input are provided at the rear of the video switcher 1. FIG. 4 is a diagram showing those slots with input modules. Any one of three types of input modules, which are an SD module 4, a PC module 5 and an SDI module 6, can be mounted to the three slots of Slot 1, Slot 2 and Slot 3, respectively.

The SD module 4 has terminals 4a, 4b, terminals 4c, 4d to respectively input two channels of composite signals and S-Video signals, and terminals 4e, 4f to input and output two channels of DV signals, to which two channels of any one of those three types of video signals can be input.

The PC module 5 has terminals 5a, 5b to input two channels of RGB signals. The SDI module 6 has terminals 6a, 6b to input two channels of SDI signals (serial/digital video signal based on SMPTE259M) and a terminal 6c to output one channel of SDI signal.

The operation unit 2 shown in FIG. 3 performs an input setup of mounting input modules from among the SD module 4, PC module 5 and SDI module 6 to Slot 1, Slot 2 and Slot 3 respectively, and selecting the type of video signal input thereto, as the above-described content of setup and setup change.

Figure 5:
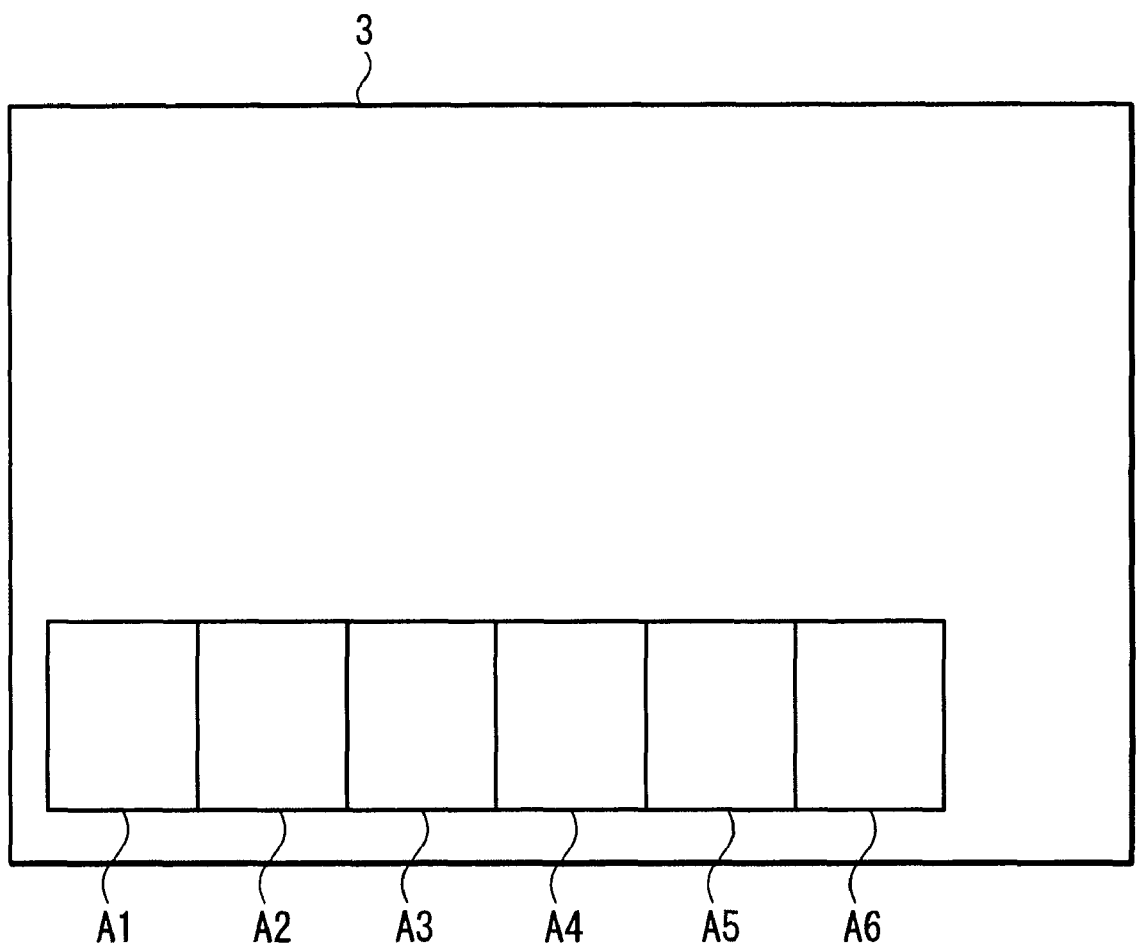
FIG. 5 is a diagram showing display areas for thumbnail pictures of input video signals on a screen of a liquid crystal display shown in FIG. 3.

Thumbnail pictures of video signals of total six channels, which are input to the input modules mounted to Slot 1 through Slot 3 shown in FIG. 4, are respectively displayed on a part of the screen of the liquid crystal display 3 shown in FIG. 3. FIG. 5 is a diagram showing display areas for the thumbnail pictures. Each of six areas A1 through A6A displays a thumbnail picture of the input video signal on one channel.

It should be noted that there are other areas on the screen of the liquid display 3 than the area where such thumbnail pictures are displayed. Specifically, there is an area for displaying a picture of the video signal selected by the operation of the operation unit 2 as the video signal before switching (PGM signal) and the video signal after switching (NEXT signal) among the input video signals. Further, there is an area for displaying a menu for the operation. However, illustrations thereof are omitted since such areas are not directly related to embodiments of the present invention.

Figure 6:
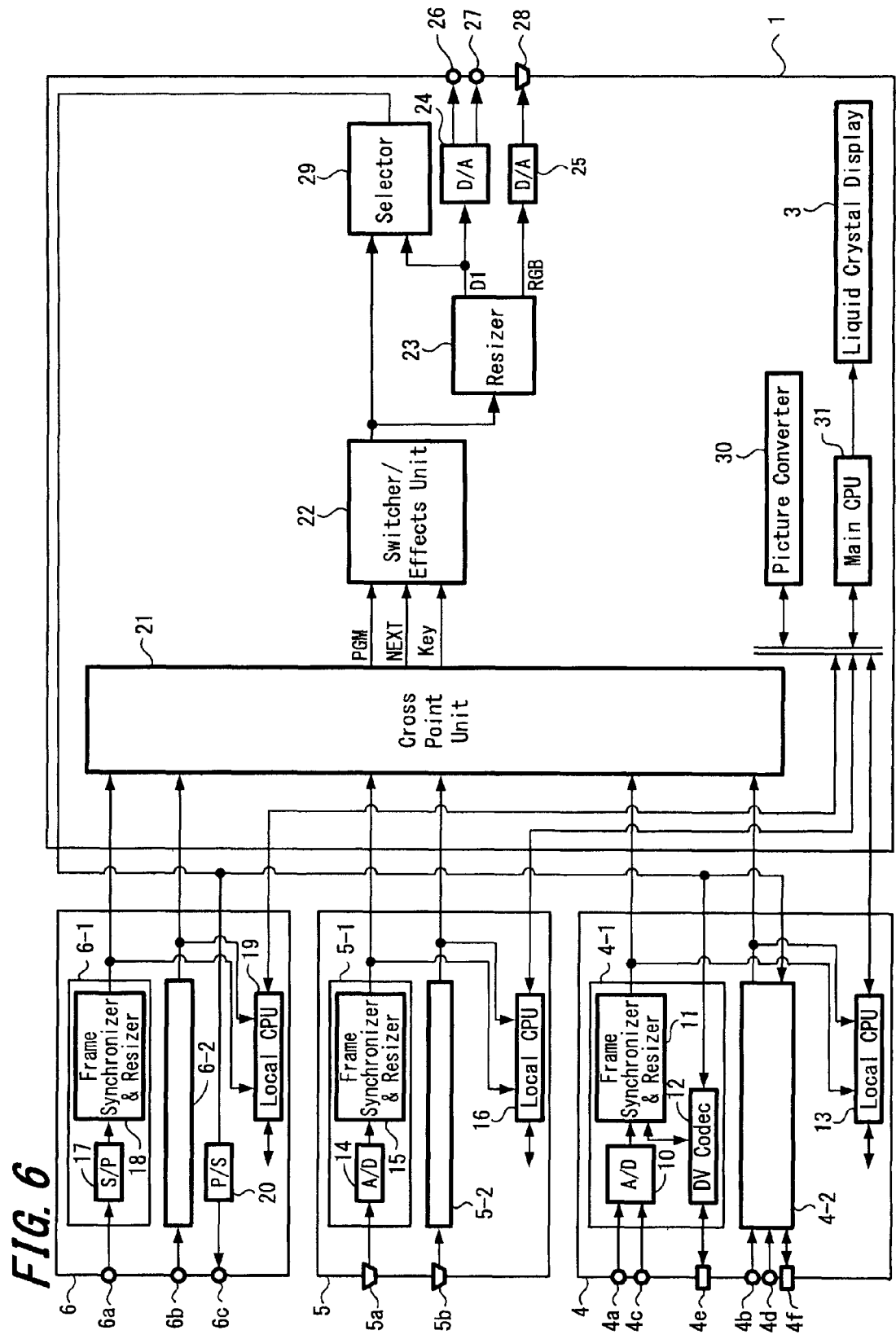
FIG. 6 is a block diagram showing a configuration of the video switcher shown in FIG. 3 and input modules shown in FIG. 4.

FIG. 6 is a block diagram showing a configuration of relevant portions of the video switcher 1 with configurations of the SD module 4, PC module 5 and SDI module 6 shown in FIG. 4 and a connection relation between the input modules mounted to Slot 1 through Slot 3 and the video switcher 1.

The SD module 4 includes a block 4-1 configured to process composite signal, S-Video signal, or DV signal input from the terminal 4a, 4c or 4e and a block 4-2 configured to process composite signal, S-Video signal or DV signal input from the terminal 4b, 4d or 4f. Also, the PC module 5 includes a block 5-1 configured to process RGB signal input from the terminal 5a and a block 5-2 configured to process RGB signal input from the terminal 5b. Further, the SDI module 6 includes a block 6-1 configured to process SDI signal input from the terminal 6a and a block 6-2 configured to process SDI signal input from the terminal 6b. Since the two blocks in the respective input modules have internal configurations similar to each other, the configuration of one of the two blocks is shown as a representative.

Composite signal input from the terminal 4a to the SD module 4 and S-Video signal input from the terminal 4c to the SD module 4 are supplied to an A/D converter 10. The A/D converter 10 converts the input video signal into a digital component signal (D1 signal) through synchronization detection processing, luminance/color-difference separation processing and analogue/digital conversion processing and supplies the converted D1 signal to a frame synchronizer and resizer 11.

The DV signal input from the terminal 4e to the SD module 4 is sent to a DV codec 12. The DV codec 12 converts the input DV signal into a D1 signal through synchronization detection processing and decoding processing and supplies the converted D1 signal to the frame synchronizer and resizer 11.

The frame synchronizer and resizer 11 synchronizes the D1 signals received from the A/D converter 10 and the DV codec 12 with a reference synchronization signal in the video switcher 1. Subsequently, the frame synchronizer and resizer 11 converts a picture size of the signal into 1,280×1,024 pixels (SVGA) that is a unified picture size in processing performed in the video switcher 1.

The D1 signal having the picture size converted by the frame synchronizer and resizer 11 is supplied from the frame synchronizer and resizer 11 to a cross point unit 21 in the video switcher 1 and is also supplied from the frame synchronizer and resizer 11 to a picture converter 30 in the video switcher 1 through a local CPU 13.

Composite signal, S-Video signal or DV signal input from the terminal 4b, 4d or 4f to the SD module 4 is also converted into a D1 signal of 1,280×1,020 pixels in the same manner and is supplied to the cross point unit 21 and the picture converter 30 in the video switcher 1.

The content of processing in the SD module 4 varies depending on the type of input video signal. Specifically, input composite signal or S-Video signal is converted into D1 signal in the A/D converted 10. On the other hand, input DV signal is converted into D1 signal in the DV codec 12. Moreover, the luminance/color difference separation processing in the A/D converter 10 is also different between composite signal and S-Video signal. The processing to be performed in the SD module 4 is determined in accordance with a type of video signal by a main CPU 31 included in the video switcher 1 depending on a slot among Slot 1 through Slot 3 to which the SD module 4 is mounted, as later described.

Analogue RGB signal input from the terminal 5a to the PC module 5 is converted into a digital RGB signal of 1,280×1,024 pixels by an A/D converter 14 and a frame synchronizer and resizer 15, and the converted digital RGB signal is supplied from the frame synchronizer and resizer 15 to the cross point unit 21 in the video switcher 1. Further, the converted digital RGB signal is also supplied from the frame synchronizer and resizer 15 to the picture converter 30 in the video switcher 1 through a local CPU 16.

The analogue RGB signal input from the terminal 5b to the PC module 5 is also converted into a digital RGB signal of 1,280×1,024 pixels in the same manner and is supplied to the cross point unit 21 and the picture converter 30 in the video switcher 1.

The processing to be performed in the PC module 5 is also determined in accordance with a type of video signal by a main CPU 31 included in the video switcher 1 depending on a slot among Slot 1 through Slot 3 to which the PC module 5 is mounted.

SDI signal input from the terminal 6a to the SDI module 6 is converted into D1 signal by a S/P (Serial/Parallel) converter 17. Subsequently, the resultant signal is converted into a signal having the picture size of 1,280×1,024 pixels by a frame synchronizer and resizer 18, and is supplied to the cross point unit 21 in the video switcher 1 from the frame synchronizer and resizer 18. Further, the signal is supplied from the frame synchronizer and resizer 18 to the picture converter 30 in the video switcher 1 through a local CPU 19.

SDI signal input from the terminal 6b to the SDI module 6 is also converted into the D1 signal of 1,280×1,024 pixels in the same manner and is supplied to the cross point unit 21 and the picture converter 30 in the video switcher 1.

The processing to be performed in the SDI module 6 is also determined in accordance with a type of video signal by a main CPU 31 included in the video switcher 1 depending on a slot to which the SDI module 6 is mounted among Slot 1 through Slot 3.

The cross point unit 21 in the video switcher 1 receives the digital video signals of 1,280×1,024 pixels of maximum six channels input from Slot 1 through Slot 3. The cross point unit 21 selects a video signal of one channel as the video signal before switching (PGM input), video signal after switching (NEXT input), and signal for keying, respectively. The cross point unit selects those signals by the control of the main CPU 31 based on the operation of selecting input video performed at the operation unit 2 (FIG. 3), and sends the selected video signals to a switcher/effects unit 22.

The switcher/effects unit 22 performs video switching and video processing (effects such as wipe, and keying) by the control of the main CPU 31 based on the video switching operation and effect selection operation using the operation unit 2.

The video signal (PGM output) formed through the switching and processing performed at the switcher/effects unit 22 is converted into D1 signal or digital RGB signal at a resizer 23. Further, the resultant signal is converted into composite signal or S-Video signal or analogue RGB signal at D/A converters 24 and 25 both by the control of the main CPU 31 based on the video output mode selection operation performed at the operation unit 2. Subsequently, the converted signals are output from video output terminals 26 through 28 of the video switcher 1. In addition, PGM output from the switcher/effects unit 22 and D1 signal from the resizer 23 are also returned to the DV codec 12 in the SD module 4 and the P/S converter 20 in the SDI module 6 through a selector 29 by the control of the main CPU 31 in response to the video output mode selection operation. As a result, returned signals are output as D1 signal and SDI signal from the terminals 4e and 4f of the SD module 4 and the terminal 6c of the SDI module 6, respectively.

The picture converter 30 compresses a digital video signal of 1,280×1,024 pixels of maximum six channels input from Slot 1 through Slot 3 into the video signal for thumbnail display and supplies the compressed video signal to the main CPU 31.

The main CPU 31 causes the thumbnail picture of each channel to be displayed in each of the areas A1 through A6 of the liquid crystal display 3 using the compressed video signal as shown in FIG. 5. Further, the main CPU causes the thumbnail pictures of the selected channels as the PGM input and NEXT input to be displayed in other areas of the liquid crystal display 3.

It should be noted that the video switcher 1 further includes a slot for mounting a recording device such as a compact memory card, although not illustrated in the figure.

Next, input setup processing performed in the video switcher 1 is explained. As described above, the operation unit 2 is capable of performing not only the setup of the video switcher 1 but also the storage and retrieval of the setup content. Specifically, according to such function, data showing the content of setup performed by the user is collectively stored in a memory in the main CPU 31 and the stored data is later read and used. Further, the data may be stored in a compact memory card so that another video switcher can use the data. The main CPU 31 controls each unit included in the video switcher 1 and an input module mounted to each of Slot 1 through Slot 3 based on the setup content data retrieved.

The content of setup performed with the above-described function includes such input setup as follows. Specifically, the input setup includes determining: the type of input module mounted to each of Slot 1 through Slot 3; the types of video signals respectively input to the two blocks of each input module; and areas for the thumbnail pictures of the video signals of six channels output from Slot 1 through Slot 3 respectively displayed in the areas A1 through A6 (as shown in FIG. 5) of the liquid crystal display 3.

It should be noted that first blocks (block 4-1 in the SD module 4, block 5-1 in the PC module 5, and block 6-1 in the SDI module 6) in the respective input modules mounted to Slot 1, Slot 2 and Slot 3 are hereinafter referred to as "Slot 1-1", "Slot 2-1" and "Slot 3-1". Further, second blocks (block 4-2 in the SD module 4, block 5-2 in the PC module 5, and block 6-2 in the SDI module 6) in the respective input modules mounted are referred to as "Slot 1-2", "Slot 2-2" and "Slot 3-2". When referring to respective blocks in this manner, the above-described input setup is expressed as follows. Specifically, the input setup includes determining: the type of input module mounted to each slot of Slot 1 through Slot 3; the types of video signals respectively input to Slots 1-1, 1-2, 2-1, 2-2, 3-1 and 3-2; and areas for the thumbnail pictures of the video signals output from the Slots 1-1, 1-2, 2-1, 2-2, 3-1 and 3-2 respectively displayed in the areas A1 through A6 (as shown in FIG. 5) of the liquid crystal display 3.

However, if input setup of the past is used with such function, there may be a number of cases in which the input modules mounted to Slot 1 through Slot 3 have been changed to other types of input modules depending on a video camera and personal computer being used, since the type of input video signal to the video switcher 1 is dependent on the video camera and personal computer used at present. In addition, when another video switcher uses the input setup, there are a number of cases in which an input module having input setup originally different from the input setup is mounted.

Figure 7:
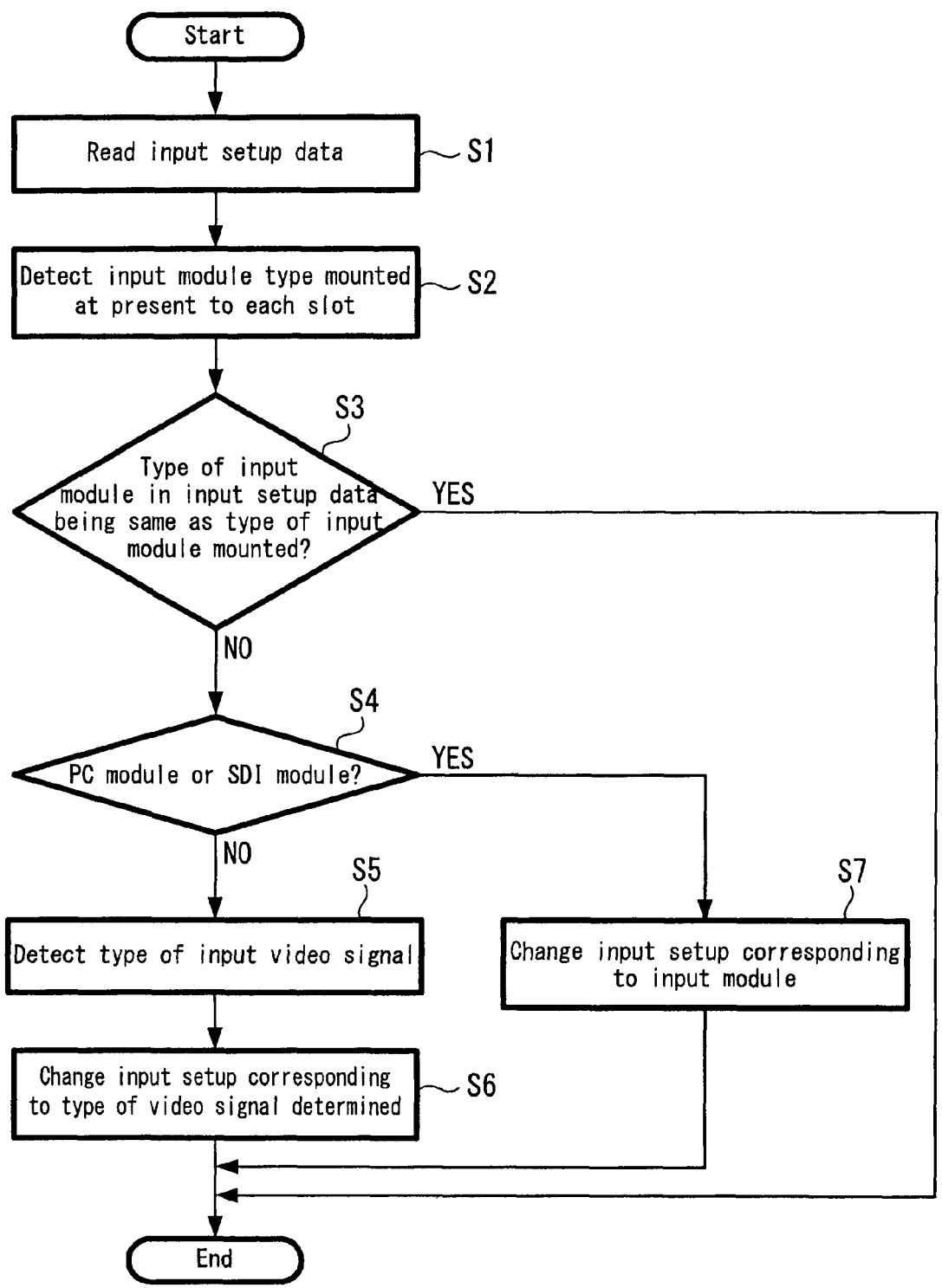
FIG. 7 is a flow chart illustrating input setup change processing performed by a main CPU indicated in FIG. 6.

Therefore, the main CPU 31 executes input setup change processing as shown in FIG. 7 and input setup change processing as shown in FIG. 9, on the input setup retrieved by the above-described function.

According to input setup change processing indicated in FIG. 7, input setup data is read (step S1). Subsequently, the type of input module mounted at present to each of Slot 1 through Slot 3 is detected based on identification information of each type of input module that is stored in the respective local CPU 13, 16 and 19 (as shown in FIG. 6) in the SD module 4, PC module 5 and SDI module 6 (step S2).

Subsequently, it is determined for each of Slot 1 through Slot 3 whether the type of input module indicated in the read input setup data corresponds to the type of the input module mounted at present (step S3).

If there is a slot to which is mounted an input module different from a module indicated in input setup data, it is determined whether the input module mounted at present to the slot is a PC module 5 or SDI module 6 (step S4). If the result is NO (the input module mounted at present is an SD module 4), a synchronization detection result is obtained at the A/D converter 10 or DV codec 12 in the respective blocks of 4-1 and 4-2 in the SD module 4 (shown in FIG. 6) through the local CPU 13. Subsequently, it is determined based on the synchronization detection result which type of video signal is input to the respective blocks of 4-1 and 4-2 in the SD module 4 among composite signal, S-Video signal and DV signal (step S5).

Subsequently, the input setup is changed so that the processing corresponding to the determined type of video signal is performed at respective blocks in the input module of the slot (step S6), and the processing is ended.

If the result is YES at step S4, video signals input to the PC module 5 and SDI module 6 are RGB signal and SDI signal respectively. Therefore, input setup is changed so that the input module of the slot in the case of the PC module 5 performs processing corresponding to RGB signal (step S7). Similarly, input setup is changed so that the input module of the slot in the case of the SDI module 6 performs processing corresponding to SDI signal (step S7), and the processing is ended.

In the case where the result is YES at step S3, processing is ended without changing input setup since the input module mounted to each of Slot 1 through Slot 3 can process the input video signal without any change.

Figure 2A:
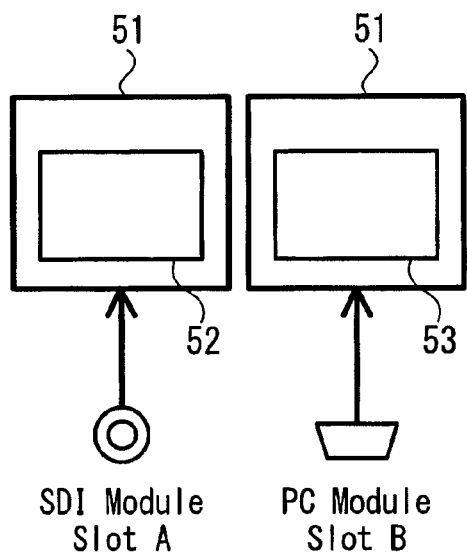
FIGS. 2A and 2B are diagrams showing an example in which an input video is not displayed on the video switcher according to related art.
Figure 2B:
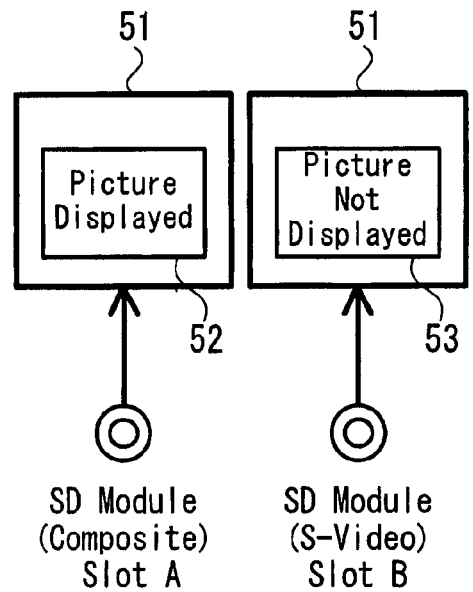

FIGS. 8A, 8B and 8C are diagrams showing an example in which input setup is changed through the input setup change processing indicated in FIG. 7. In this example, the PC module 5 is mounted to Slot 1 as shown in FIG. 8A and the input setup is stored in a state of a picture of the video signal from Slot 1 being displayed in the area A1 (as shown in FIG. 5) of the liquid crystal display 3. Further, as shown in FIG. 8B, the input setup is read after the input module mounted to Slot 1 is exchanged with the SD module 4, or the input setup is read by another video switcher having the SD module 4 mounted to Slot 1. In such a case, S-Video signal is input to the block 4-1 of the SD module 4. In the figures, Slot 1-1 indicates a portion corresponding to the first block of the input module mounted to Slot 1 as described above. FIGS. 8A and 8B illustrate the same states as those of slot B shown in FIGS. 2A and 2B.

Here, the processing in FIG. 7 is performed from step S3 to steps S4 and S5. The video signal input to the block 4-1 of the SD module 4 is automatically determined as S-Video signal at step S5. Afterward, the input setup is automatically changed at step S6 so that the processing corresponding to S-Video signal is performed at the block 4-1 of the SD module 4. More specifically, input setup is automatically changed corresponding to the type of video signal input at present. Accordingly, there is no need for the user to confirm from the state of connection between the SD module 4 and video camera or the like that S-Video signal is input to the block 4-1 of the SD module 4 mounted to the slot of Slot 1. Further, there is no need to manually change the input setup of Slot 1-1 to S-Video signal by operating the operation unit 2.

Accordingly, since the type of input video signal matches S-Video signal obtained through the input setup change processing shown in FIG. 7, input S-Video signal can be processed in the block 4-1 of the SD module 4. As a result, as shown in FIG. 8C, a thumbnail picture of S-Video signal output from Slot 1-1 is displayed in the area A1 of the liquid crystal display 3 and the S-Video signal can be switched and output.

As described above, the video switcher 1 can use the past input setup and can automatically change input setup through the input setup change processing indicated in FIG. 7 corresponding to the type of video signal input at present.

In the input setup change processing indicated in FIG. 9, the same processing (steps S11 through S13) as that of steps S1 through S3 of the input setup change processing indicated in FIG. 7 is performed. Subsequently, if it is determined that there is a slot to which is mounted an input module different from a module indicated in input setup data, loop processing of steps S14 through S19 is performed on each slot in the numerical order of the above-described Slots 1-1, 1-2, 2-1, 2-2, 3-1 and 3-2.

The processing performed on each slot in the loop processing is as follows. First, it is searched based on the above-described identification information on each type of input module whether the same type of input module as the input module, which has been mounted to the slot according to the input setup data read at step S11, is mounted to another slot at present (step S15).

If the same type of input module is found, it is determined whether the type of input module indicated in the input setup data read at step S11 is the type of input module mounted at present to the above-described "another slot" to which the same type of input module is mounted (step S16). In the case where the result is NO, it is determined whether the input setup is already changed at subsequent step S18 with respect to the above-described "another slot" (step S17).

If the result is NO, input setup is changed so that the video signal output from the above-described "another slot" is alternatively displayed in an area where a picture of the video signal, which is output from the slot and determined to be different at step S13 according to the input setup data read at step S11, has been displayed in the areas A1 through A6 (as shown in FIG. 5) of the liquid crystal display 3 (step S18).

The processing is ended after completing the loop processing. The processing is ended without further processing: in the case where the result is YES at step S13; in the case where the result is NO at step S15; and in the case where the result is YES at step S16 or step S17.

FIGS. 10A, 10B and 10C are diagrams showing an example in which input setup is changed through the input setup change processing indicated in FIG. 9. As shown in FIG. 10A, an SDI module 6, PC module 5 and SD module 4 are respectively mounted to Slot 1, Slot 2 and Slot 3, and composite signals are input to Slots 3-1 and 3-2 respectively; and thumbnail pictures of video signals output from the Slots 1-1, 1-2, 2-1, 2-2, 3-1 and 3-2 are displayed in the areas A1, A5, A6, A2, A3 and A4 of the liquid crystal display 3, respectively. Such a state is stored as an input setup. Further, as shown in FIG. 10B, the above-described input setup is read after the input modules mounted to Slot 1, Slot 2 and Slot 3 are respectively changed to the PC module 5, SD module 4, and SDI module 6. Alternatively, the input setup is read by another video switcher having the PC module 5, SD module 4, and SDI module 6 respectively mounted to Slot 1, Slot 2 and Slot 3. In this state, composite signals are respectively input to the blocks 4-1 and 4-2 of the SD module 4.

In the state shown in FIG. 10B, the thumbnail pictures are displayed respectively in the areas of A1 through A6 by the above-described input setup change processing indicated in FIG. 7. However, correspondence between thumbnail pictures of video signals and displayed areas, shown in FIG. 10B, becomes different from that shown in FIG. 10A.

In such a case, the processing goes from step S13 to the loop processing of steps S14 through S19 in the processing indicated in FIG. 9. As a result, as shown in FIG. 10C, the correspondence between the video signals and the areas A1 through A6 is changed by the loop processing so that the correspondence becomes the same as that shown in FIG. 10A.

Accordingly, the correspondence between the thumbnail pictures of video signals displayed and areas is automatically maintained to be constant.

Next, another example of the input setup change processing performed by the main CPU 31 will be explained with reference to FIG. 11. According to the input setup change processing indicated in FIG. 11, the same processing (steps S21 through S25) as steps S1 through S5 of the input setup change processing indicated in FIG. 7 is first performed. After the result is YES at step S24 and after the processing of step S25 is performed, processing (steps S26 and S27) equivalent to that of steps S15 and S16 in the input setup change processing indicated in FIG. 9 is performed on the slot determined to be a slot having an input module different from the module indicated in input setup data at step S23.

Figure 12:
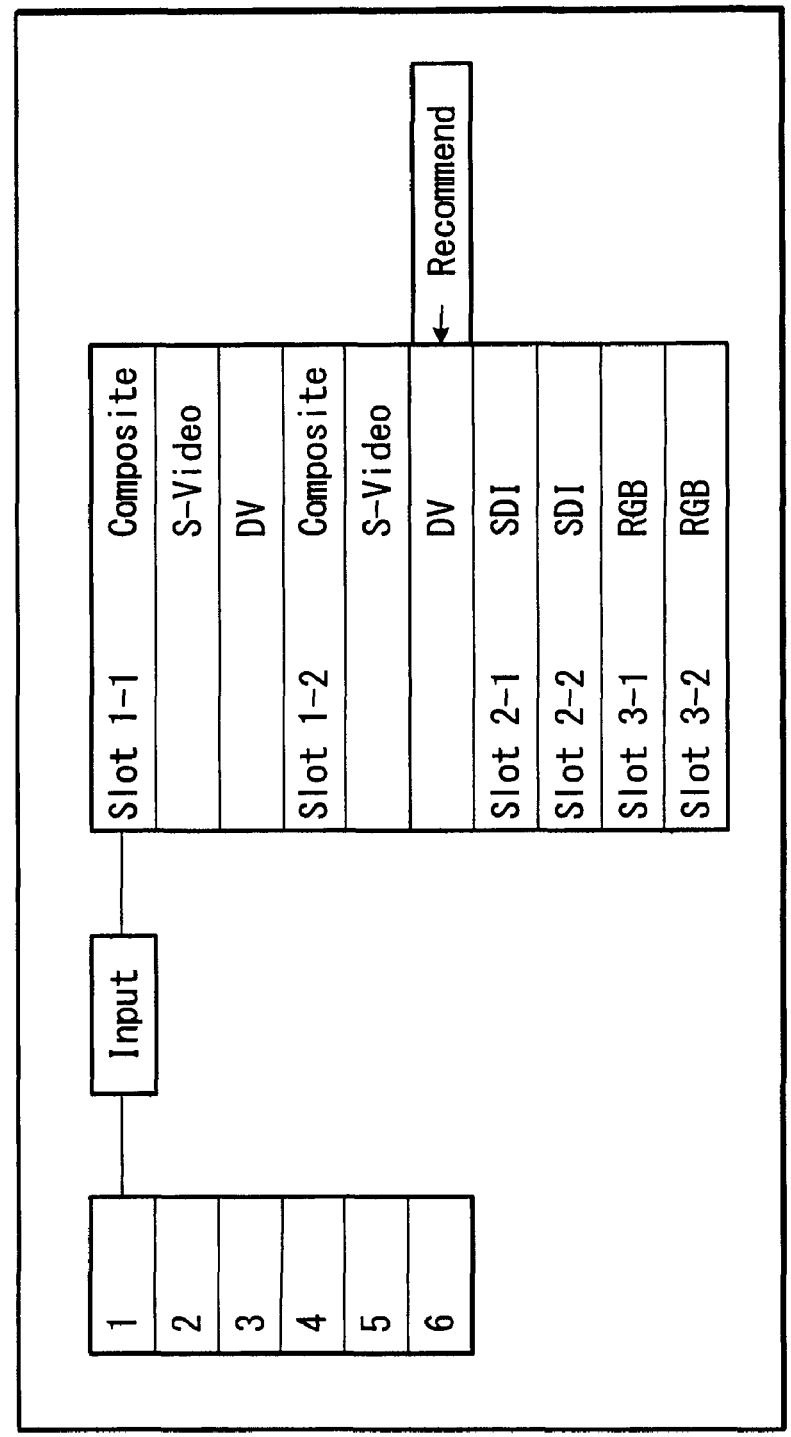
FIG. 12 is a diagram showing an example of an input setup change recommendation screen based on the processing of FIG. 11.

Further, based on the processing performed at steps S26 and S27 and a result of the type of video signal determined at step S25, such an input setup change recommendation screen as exemplarily shown in FIG. 12 is displayed on the liquid crystal display 3 (step S28). Then, the process is ended.

As shown in FIG. 12, numerals 1 through 6 shown in vertical direction at the left end of the input setup change recommendation screen indicates the areas A1 through A6 (shown in FIG. 5) on the liquid crystal display 3. The input setup change recommendation screen recommends the change of the input setup to maintain the correspondence between the types of video signals and the respective areas A1 through A6 of the liquid crystal display 3 to be constant as exemplarily shown in FIGS. 10A to 10C based on the result of the processing at steps S26 and S27. Further, recommendation for changing the input setup into the determined type of video signal is displayed with respect to the slot, the type of video signal of which is determined at step S25. FIG. 12 shows a state in which a thumbnail picture of video signal output from Slot 1-2 is displayed in the area A1 and the recommendation for changing the input setup of Slot 1-2 into DV signal is displayed.

Referring to the displayed input setup change recommendation screen as shown in FIG. 12, the user can confirm easily and instantaneously which thumbnail picture of a video signal output from a slot should be displayed in which area in order to constantly maintain the correspondence between the types of video signals and the areas A1 through A6. Hence, the user can perform the operation of changing the input setup using the operation unit 2 so that the thumbnail picture of the video signal output from Slot 1-2 is displayed in the area A1. In addition, the user can confirm easily and instantaneously from the above display that DV signal is input to the block 4-2 of the SD module 4 mounted to Slot 1 without confirmation based on the connection state between the SD module 4 and the video camera, or the like, and the operation of changing the input setup of Slot 1-2 into DV signal can be performed using the operation unit 2.

If the user changes the input setup as recommended in the display shown in FIG. 12, Slot 1-2 is excluded from the slots to which the recommendation is displayed in the input setup change recommendation screen with respect to the areas A2 through A5 other than the area A1. Such case is equivalent to the case in which the result is YES at step S17 indicated in FIG. 9.

Figure 11:
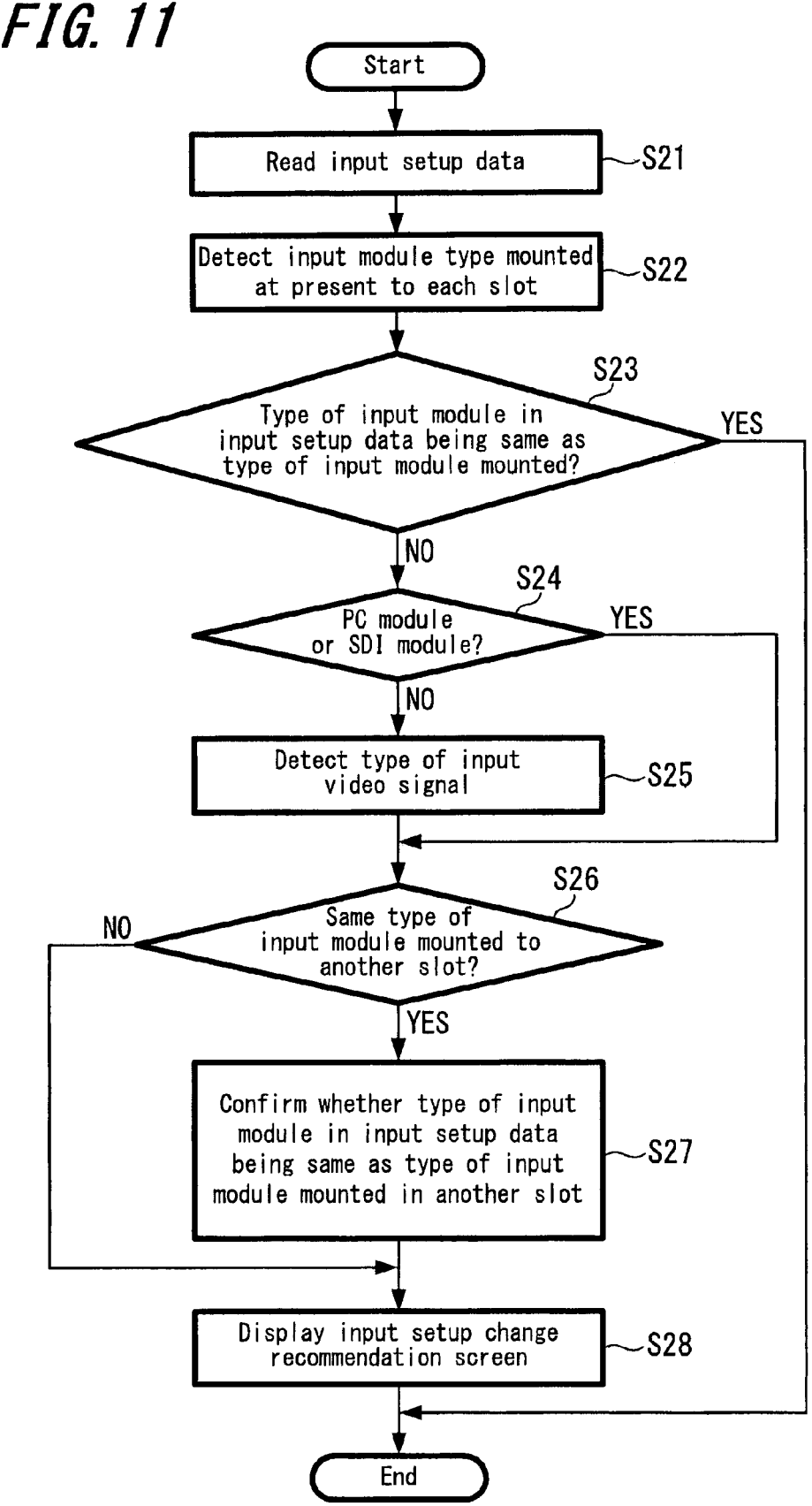
FIG. 11 is a flow chart illustrating another example of input setup change processing.

It should be noted that the recommendation screen is displayed in the input setup change processing indicated in FIG. 11 upon executing both the determination of the type of video signal by the input setup change processing of FIG. 7 and the search of an alternative slot by the input setup change processing of FIG. 9. However, embodiments of the present invention are not limited thereto, and the determination of the type of video signal by the input setup change processing of FIG. 7 alone may be performed such that the recommendation for changing the input setup to the determined type of video signal is displayed.

Further, in the above-described examples, embodiments of the present invention are applied to a video switcher to which is mounted an SD module capable of inputting any one of video signals among composite signal, S-Video signal and DV signal. However, embodiments of the present invention can be applied to any video switching apparatuses to which is mounted an input module performing processing which is different depending on the type of input video signal.

It should be understood by those skilled in the art that various modifications, combinations, sub-combinations and alterations may occur depending on design requirements and other factors insofar as they are within the scope of the appended claims or the equivalents thereof.

What is claimed is:

1. A video switching apparatus
having a plurality of slots each for mounting any of
a first input module capable of inputting any one of a plurality of predetermined types of video signals and performing processing, content of which varies depending on the type of input video signal and
a second input module capable of inputting only predetermined one type of video signal, switching and outputting video signals of a plurality of channels input to input modules mounted to the plurality of slots, the video switching apparatus comprising:
input setup data memory processing means for storing input setup data indicating a type of input module mounted to each of the plurality of slots and a type of video signal input thereto in memory means;
detecting means for reading the input setup data from the memory means and detecting a slot having an input module mounted at present the type of which is different from a module indicated in the read input setup data; and
input setup changing means for determining the type of video signal input to the first input module and causing the first input module to execute processing corresponding to the determined type of video signal upon detecting by the detecting means that the input module mounted at present to the slot is the first input module,
wherein the first input module processes a type of video signals different from the second input module, and
wherein each input module includes a frame synchronizing and resizing section that synchronizes and resizes input video signals and a local CPU that stores identification information of the input module.

2. A video switching apparatus according to claim 1, further comprising:
input video display processing means for displaying a picture of each video signal input to an input module mounted to each of the plurality of slots, in a part of area on a screen of display means based on data included in the input setup data, the data indicating an area where the picture of the video signal from each of the plurality of slots is displayed on the screen of the display means, wherein
the input setup changing means searches for the slot having an input module mounted at present the type of which is the same as the input module that has been mounted to the slot according to the input setup data, upon detecting the slot having an input module mounted at present the type of which is different from the type of a module indicated in the input setup data read by the detecting means, and executes the picture of the video signal from the searched slot to be displayed in the area on the screen of the display means where the picture of the video signal from the slot detected in the input setup data has been displayed.

3. The video switching apparatus according to claim 1, wherein each input module includes two functional blocks that process video signals that are the same type and are input from two channels.

4. The video switching apparatus according to claim 1, wherein the video switching apparatus is portable.

5. The video switching apparatus according to claim 1, wherein the first input module processes S-Video signal, DV signal and composite signal, and the second input module processes RGB signal or SDI signal.

6. A video signal input setting method for a video switching apparatus
having a plurality of slots each for mounting any of
a first input module capable of inputting any one of a plurality of predetermined types of video signals and performing processing, content of which varies depending on the type of input video signal and
a second input module capable of inputting only predetermined one type of video signal,
switching and outputting video signals of a plurality of channels input to the input modules mounted to the plurality of slots, the video signal input switching method comprising the steps of:
storing by a controller provided in the video switching apparatus input setup data indicating a type of input module mounted to each of the plurality of slots and a type of video signal input thereto in a memory unit;
reading by the controller the input setup data from the memory unit and detecting a slot having an input module mounted at present the type of which is different from the type of a module indicated in the read input setup data; and
determining by the controller the type of video signal input to the first input module and causing the first input module to execute processing corresponding to the determined type of video signal upon detecting that the input module mounted at present to the slot is the first input module,
wherein the first input module processes a type of video signals different from the second input module, and
wherein each input module includes a frame synchronizing and resizing section that synchronizes and resizes input video signals and a local CPU that stores identification information of the input module.

7. A video switching apparatus
having a plurality of slots each for mounting any of
a first input module capable of inputting any one of a plurality of predetermined types of video signals and performing processing, content of which varies depending on the type of input video signals and a second input module capable of inputting only predetermined one type of video signal, switching and outputting video signals of a plurality of channels input to the input modules mounted to the plurality of slots, the video switching apparatus comprising:

input setup data memory processing means for storing input setup data indicating a type of input module mounted to each of the plurality of slots and a type of video signal input thereto in memory means;

detecting means for reading the input setup data from the memory means and detecting a slot having an input module mounted at present the type of which is different from a module indicated in the read input setup data; and information display processing means for determining the type of video signal input to the first input module and causing information indicating the determined type of video signal to be displayed on a screen of display means upon detecting by the detecting means that the input module mounted at present to the slot is the first input module, wherein the first input module processes a type of video signals different from the second input module, and wherein each input module includes a frame synchronizing and resizing section that synchronizes and resizes input video signals and a local CPU that stores identification information of the input module.

8. A video switching apparatus according to claim 7, further comprising:

an input video display processing means for displaying a picture of each video signal input to the input module mounted to each of the plurality of slots, in a part of area on a screen of the display means based on data included in the input setup data, the data indicating an area where the picture of the video signal from each of the plurality of slots is displayed on the screen of the display means, wherein the information display processing means searches for the slot having an input module mounted at present the type of which is the same as the input module that has been mounted to the slot according to the input setup data, upon detecting the slot having an input module mounted at present the type of which is different from the type of a module indicated in the input setup data read by the detecting means, and further displays information indicating the searched slot in the area on the screen of the display means.

9. The video switching apparatus according to claim 7, wherein each input module includes two functional blocks that process video signals that are the same type and are input from two channels.

10. The video switching apparatus according to claim 7, wherein the video switching apparatus is portable.

11. The video switching apparatus according to claim 7, wherein the first input module processes S-Video signal, DV signal and composite signal, and the second input module processes RGB signal or SDI signal.

12. A video signal input setting method for a video switching apparatus having a plurality of slots each for mounting any of a first input module capable of inputting any one of a plurality of predetermined types of video signals and performing processing, content of which varies depending on the type of input video signal and a second input module capable of inputting only predetermined one type of video signal, switching and outputting video signals of a plurality of channels input to the input modules mounted to the plurality of slots, the video signal input switching method comprising the steps of:

storing by a controller provided in the video switching apparatus input setup data indicating a type of the input module mounted to each of the plurality of slots and a type of video signal input thereto in a memory unit;

reading by the controller the input setup data from the memory unit and detecting a slot having an input module mounted at present the type of which is different from the type of a module indicated in the read input setup data; and determining by the controller the type of video signal input to the first input module and causing information indicating the determined type of video signal to be displayed on a screen of a display unit upon detecting that the input module mounted at present to the slot is the first input module, wherein the first input module processes a type of video signals different from the second input module, and wherein each input module includes a frame synchronizing and resizing section that synchronizes and resizes input video signals and a local CPU that stores identification information of the input module.

13. A video switching apparatus having a plurality of slots each for mounting any of a first input module capable of inputting any one of a plurality of predetermined types of video signals and performing processing, content of which varies depending on the type of input video signal and a second input module capable of inputting only predetermined one type of video signal, switching and outputting video signals of a plurality of channels input to the input modules mounted to the plurality of slots, the video switching apparatus comprising:

an input setup data memory processor configured to store input setup data indicating a type of input module mounted to each of the plurality of slots and a type of video signal input thereto in a memory unit;

a detector configured to read the input setup data from the memory unit and configured to detect a slot having an input module mounted at present the type of which is different from a module indicated in the read input setup data; and an input setup changer configured to determine the type of video signal input to the first input module and configured to cause the first input module to execute processing corresponding to the determined type of video signal upon detecting by the detector that the input module mounted at present to the slot is the first input module, wherein the first input module processes a type of video signals different from the second input module, and wherein each input module includes a frame synchronizing and resizing section that synchronizes and resizes input video signals and a local CPU that stores identification information of the input module.

14. The video switching apparatus according to claim 13, wherein each input module includes two substantially functional blocks that process video signals that are the same type and are input from two channels.

15. The video switching apparatus according to claim 13, wherein the video switching apparatus is portable.

16. The video switching apparatus according to claim 13, wherein the first input module processes S-Video signal, DV signal and composite signal, and the second input module processes RGB signal or SDI signal.

17. A video switching apparatus
having a plurality of slots each for mounting any of
a first input module capable of inputting any one of a plurality of predetermined types of video signals and performing processing, content of which varies depending on the type of input video signal and
a second input module capable of inputting only predetermined one type of video signal,
switching and outputting video signals of a plurality of channels input to the input modules mounted to the plurality of slots, the video switching apparatus comprising:
an input setup data memory processor configured to store input setup data indicating a type of input module mounted to each of the plurality of slots and a type of video signal input thereto in a memory unit;
a detector configured to read the input setup data from the memory unit and configured to detect a slot having an input module mounted at present the type of which is different from a module indicated in the read input setup data; and
an information display processor configured to determine the type of video signal input to the first input module and configured to cause information indicating the determined type of video signal to be displayed on a screen of a display unit upon detecting by the detector that the input module mounted at present to the slot is the first input module,
wherein the first input module processes a type of video signals different from the second input module, and
wherein each input module includes a frame synchronizing and resizing section that synchronizes and resizes input video signals and a local CPU that stores identification information of the input module.

18. The video switching apparatus according to claim 17, wherein each input module includes two functional blocks that process video signals that are the same type and are input from two channels.

19. The video switching apparatus according to claim 17, wherein the video switching apparatus is portable.

20. The video switching apparatus according to claim 17, wherein the first input module processes S-Video signal, DV signal and composite signal, and the second input module processes RGB signal or SDI signal.

* * * * *